US 7,636,722 B2

(12) United States Patent
Bunkerr et al.

(10) Patent No.: US 7,636,722 B2
(45) Date of Patent: Dec. 22, 2009

(54) SYSTEM AND METHOD FOR DESCRIBING APPLICATION EXTENSIONS IN XML

(75) Inventors: Ross Bunkerr, Seattle, WA (US); Brendan MacLean, Seattle, WA (US); Britton W. Piehler, Seattle, WA (US)

(73) Assignee: BEA Systems, Inc., San Jose, CA (US)

( * ) Notice: Subject to any disclaimer, the term of this patent is extended or adjusted under 35 U.S.C. 154(b) by 438 days.

(21) Appl. No.: 10/786,772

(22) Filed: Feb. 25, 2004

(65) Prior Publication Data

US 2005/0240902 A1 Oct. 27, 2005

Related U.S. Application Data

(60) Provisional application No. 60/451,340, filed on Feb. 28, 2003.

(51) Int. Cl.
*G06F 17/00* (2006.01)
*G06F 7/00* (2006.01)

(52) U.S. Cl. .............. 707/100; 707/103 R; 707/103 Z; 707/104.1; 717/114

(58) Field of Classification Search .............. 707/104.1, 707/102, 101; 715/501.1
See application file for complete search history.

(56) References Cited

U.S. PATENT DOCUMENTS

| | | | |
|---|---|---|---|
| 5,321,841 A | 6/1994 | East et al. ................. 718/107 |
| 5,469,562 A | 11/1995 | Saether | |
| 5,604,860 A | 2/1997 | McLaughlin et al. | |
| 5,630,131 A | 5/1997 | Palevich et al. | |
| 5,748,975 A | 5/1998 | Van De Vanter ............ 715/531 |
| 5,801,958 A | 9/1998 | Dangelo et al. | |
| 5,835,769 A | 11/1998 | Jervis et al. ................. 717/113 |
| 5,836,014 A | 11/1998 | Faiman, Jr. ................. 717/156 |
| 5,862,327 A | 1/1999 | Kwang ................. 395/200.33 |
| 5,867,822 A | 2/1999 | Sankar | |
| 5,944,794 A | 8/1999 | Okamoto et al. | |
| 5,950,010 A | 9/1999 | Hesse ......................... 395/712 |
| 5,961,593 A | 10/1999 | Gabber et al. ............... 709/219 |
| 5,966,535 A | 10/1999 | Benedikt et al. | |
| 6,012,083 A | 1/2000 | Savitzky et al. | |
| 6,016,495 A | 1/2000 | McKeehan et al. | |

(Continued)

FOREIGN PATENT DOCUMENTS

WO WO 01/90884 A2 11/2001

OTHER PUBLICATIONS

IBM TDB, "Abstraction of remote operating systems", Aug. 1, 2001, IP.com, IP.Com No. IPCOM000015157D, pp. 1-3.*

(Continued)

*Primary Examiner*—John R. Cottingham
*Assistant Examiner*—Michael Pham
(74) *Attorney, Agent, or Firm*—Squire, Sanders & Dempsey, LLP

(57) ABSTRACT

A system and method for an extendable application framework, comprising a user interface, at least one service, at least one extension, wherein one of the at least one extensions can provide access to functionality in the user interface, and wherein one of the at least one services can provide access to functionality in one of the at least one extensions.

15 Claims, 2 Drawing Sheets

U.S. PATENT DOCUMENTS

| | | | |
|---|---|---|---|
| 6,018,730 A | 1/2000 | Nichols et al. | |
| 6,023,578 A | 2/2000 | Birsan et al. | |
| 6,023,722 A | 2/2000 | Colyer | 709/201 |
| 6,028,997 A | 2/2000 | Leymann et al. | |
| 6,029,000 A | 2/2000 | Woolsey et al. | |
| 6,044,217 A | 3/2000 | Brealey et al. | 717/107 |
| 6,067,548 A | 5/2000 | Cheng | 707/103 |
| 6,067,623 A | 5/2000 | Blakley et al. | 713/201 |
| 6,070,184 A | 5/2000 | Blount et al. | |
| 6,092,102 A | 7/2000 | Wagner | |
| 6,106,569 A * | 8/2000 | Bohrer et al. | 717/100 |
| 6,119,149 A | 9/2000 | Notani | 709/205 |
| 6,141,686 A | 10/2000 | Jackowski | 709/224 |
| 6,141,701 A | 10/2000 | Whitney | |
| 6,148,336 A | 11/2000 | Thomas et al. | |
| 6,185,734 B1 | 2/2001 | Saboff et al. | |
| 6,212,546 B1 | 4/2001 | Starkovich et al. | |
| 6,222,533 B1 | 4/2001 | Notani | 345/329 |
| 6,226,675 B1 | 5/2001 | Meltzer et al. | |
| 6,230,287 B1 | 5/2001 | Pinard et al. | 714/31 |
| 6,230,309 B1 | 5/2001 | Turner | 717/1 |
| 6,237,135 B1 | 5/2001 | Timbol | 717/1 |
| 6,243,737 B1 | 6/2001 | Flanagan et al. | |
| 6,282,711 B1 | 8/2001 | Halpern | 717/11 |
| 6,292,932 B1 | 9/2001 | Baisley et al. | |
| 6,311,327 B1 | 10/2001 | O'Brien et al. | |
| 6,324,681 B1 | 11/2001 | Sebesta | 717/1 |
| 6,330,569 B1 | 12/2001 | Baisley et al. | |
| 6,334,114 B1 | 12/2001 | Jacobs et al. | |
| 6,338,064 B1 | 1/2002 | Ault et al. | 707/9 |
| 6,343,265 B1 | 1/2002 | Glebov et al. | |
| 6,349,408 B1 | 2/2002 | Smith | 717/11 |
| 6,353,923 B1 | 3/2002 | Bogle et al. | 717/128 |
| 6,360,358 B1 | 3/2002 | Elsbree et al. | |
| 6,367,068 B1 | 4/2002 | Vaidyanathan et al. | |
| 6,377,939 B1 | 4/2002 | Young | |
| 6,393,605 B1 | 5/2002 | Loomans | 717/121 |
| 6,408,311 B1 | 6/2002 | Baisley et al. | |
| 6,411,698 B1 | 6/2002 | Bauer et al. | |
| 6,445,711 B1 | 9/2002 | Scheel et al. | |
| 6,470,364 B1 | 10/2002 | Prinzing | |
| 6,516,322 B1 | 2/2003 | Meredith | |
| 6,549,949 B1 | 4/2003 | Bowman-Amuah | 709/236 |
| 6,560,636 B2 | 5/2003 | Cohen et al. | |
| 6,560,769 B1 | 5/2003 | Moore et al. | |
| 6,567,738 B2 | 5/2003 | Gopp et al. | |
| 6,584,454 B1 | 6/2003 | Hummel et al. | |
| 6,594,693 B1 | 7/2003 | Borwankar | |
| 6,594,700 B1 | 7/2003 | Graham et al. | |
| 6,601,113 B1 * | 7/2003 | Koistinen et al. | 719/316 |
| 6,604,198 B1 | 8/2003 | Beckman et al. | 713/167 |
| 6,609,115 B1 | 8/2003 | Mehring et al. | |
| 6,615,258 B1 | 9/2003 | Barry et al. | |
| 6,636,491 B1 | 10/2003 | Kari et al. | |
| 6,637,020 B1 | 10/2003 | Hammond | |
| 6,643,652 B2 | 11/2003 | Helgeson et al. | |
| 6,651,108 B2 * | 11/2003 | Popp et al. | 719/315 |
| 6,654,932 B1 | 11/2003 | Bahrs et al. | |
| 6,662,357 B1 | 12/2003 | Bowman-Amuah | |
| 6,678,518 B2 | 1/2004 | Eerola | |
| 6,684,388 B1 | 1/2004 | Gupta et al. | |
| 6,687,702 B2 | 2/2004 | Vaitheeswaran et al. | |
| 6,687,848 B1 | 2/2004 | Najmi | |
| 6,721,740 B1 | 4/2004 | Skinner et al. | |
| 6,721,779 B1 | 4/2004 | Maffeis | |
| 6,732,237 B1 | 5/2004 | Jacobs et al. | 711/119 |
| 6,748,420 B1 | 6/2004 | Quatrano et al. | |
| 6,754,884 B1 * | 6/2004 | Lucas et al. | 717/108 |
| 6,757,689 B2 | 6/2004 | Battas et al. | |
| 6,789,054 B1 | 9/2004 | Makhlouf | |
| 6,795,967 B1 | 9/2004 | Evans et al. | 719/310 |
| 6,799,718 B2 | 10/2004 | Chan et al. | |
| 6,802,000 B1 | 10/2004 | Greene et al. | 713/168 |
| 6,804,686 B1 | 10/2004 | Stone et al. | 707/104.1 |
| 6,823,495 B1 | 11/2004 | Vedula et al. | |
| 6,832,238 B1 | 12/2004 | Sharma et al. | |
| 6,836,883 B1 | 12/2004 | Abrams et al. | |
| 6,847,981 B2 | 1/2005 | Song et al. | |
| 6,850,979 B1 | 2/2005 | Saulpaugh et al. | |
| 6,859,180 B1 | 2/2005 | Rivera | |
| 6,874,143 B1 * | 3/2005 | Murray et al. | 717/173 |
| 6,889,244 B1 | 5/2005 | Gaither et al. | |
| 6,915,519 B2 | 7/2005 | Williamson et al. | |
| 6,918,084 B1 | 7/2005 | Slaughter et al. | |
| 6,920,607 B1 * | 7/2005 | Ali et al. | 715/501.1 |
| 6,922,827 B2 | 7/2005 | Vasilik et al. | |
| 6,950,866 B1 * | 9/2005 | Lowry et al. | 709/223 |
| 6,950,872 B2 | 9/2005 | Todd, II | |
| 6,959,307 B2 | 10/2005 | Apte | |
| 6,963,914 B1 | 11/2005 | Breitbart et al. | |
| 6,971,096 B1 | 11/2005 | Ankireddipally et al. | |
| 6,976,086 B2 | 12/2005 | Sadeghi et al. | |
| 6,983,328 B2 | 1/2006 | Beged-Dov et al. | |
| 6,985,939 B2 | 1/2006 | Fletcher et al. | |
| 7,000,219 B2 | 2/2006 | Barrett et al. | |
| 7,017,146 B2 | 3/2006 | Dellarocas et al. | |
| 7,035,944 B2 | 4/2006 | Fletcher et al. | |
| 7,043,722 B2 | 5/2006 | Bau, III | |
| 7,051,072 B2 | 5/2006 | Stewart et al. | |
| 7,054,858 B2 | 5/2006 | Sutherland | |
| 7,058,940 B2 * | 6/2006 | Calahan | 717/167 |
| 7,062,718 B2 | 6/2006 | Kodosky et al. | |
| 7,069,507 B1 * | 6/2006 | Alcazar et al. | 715/530 |
| 7,072,934 B2 | 7/2006 | Helgeson et al. | |
| 7,073,167 B2 | 7/2006 | Iwashita | |
| 7,076,772 B2 | 7/2006 | Zatloukal | |
| 7,089,568 B2 | 8/2006 | Yoshida et al. | |
| 7,096,422 B2 | 8/2006 | Rothschiller et al. | |
| 7,107,578 B1 | 9/2006 | Alpern | |
| 7,111,243 B1 | 9/2006 | Ballard et al. | |
| 7,117,504 B2 | 10/2006 | Smith et al. | |
| 7,127,704 B2 | 10/2006 | Van De Vanter et al. | |
| 7,143,186 B2 | 11/2006 | Stewart et al. | |
| 7,146,422 B1 | 12/2006 | Marlatt et al. | |
| 7,152,090 B2 | 12/2006 | Amirisetty et al. | |
| 7,155,705 B1 | 12/2006 | Hershberg et al. | |
| 7,159,007 B2 | 1/2007 | Stawikowski | |
| 7,165,041 B1 | 1/2007 | Guheen et al. | |
| 7,181,731 B2 | 2/2007 | Pace et al. | |
| 7,184,967 B1 | 2/2007 | Mital et al. | |
| 7,240,331 B2 | 7/2007 | Vion-Dury et al. | |
| 7,260,599 B2 | 8/2007 | Bauch et al. | |
| 7,260,818 B1 | 8/2007 | Iterum et al. | |
| 2002/0004848 A1 | 1/2002 | Sudarshan et al. | |
| 2002/0010781 A1 | 1/2002 | Tuatini | |
| 2002/0010803 A1 | 1/2002 | Oberstein et al. | |
| 2002/0016759 A1 | 2/2002 | Macready et al. | 705/37 |
| 2002/0049788 A1 | 4/2002 | Lipkin et al. | |
| 2002/0073080 A1 | 6/2002 | Lipkin | |
| 2002/0073236 A1 | 6/2002 | Helgeson et al. | |
| 2002/0073396 A1 | 6/2002 | Crupi et al. | |
| 2002/0078365 A1 | 6/2002 | Burnett et al. | 713/200 |
| 2002/0083075 A1 | 6/2002 | Brummel et al. | |
| 2002/0111922 A1 | 8/2002 | Young et al. | |
| 2002/0116454 A1 | 8/2002 | Dyla et al. | |
| 2002/0120685 A1 | 8/2002 | Srivastava et al. | |
| 2002/0143960 A1 | 10/2002 | Goren et al. | |
| 2002/0152106 A1 | 10/2002 | Stoxen et al. | |
| 2002/0161826 A1 | 10/2002 | Arteaga et al. | |
| 2002/0165936 A1 | 11/2002 | Alston et al. | |
| 2002/0169644 A1 | 11/2002 | Greene | |
| 2002/0174178 A1 | 11/2002 | Stawikowski | |
| 2002/0174241 A1 | 11/2002 | Beged-Dov et al. | |
| 2002/0184610 A1 | 12/2002 | Chong et al. | |

| | | |
|---|---|---|
| 2002/0188486 A1 | 12/2002 | Gil et al. |
| 2002/0194244 A1 | 12/2002 | Raventos |
| 2002/0194267 A1 | 12/2002 | Flesner et al. |
| 2002/0194495 A1 | 12/2002 | Gladstone et al. |
| 2002/0198891 A1* | 12/2002 | Li et al. .................... 707/102 |
| 2003/0004746 A1 | 1/2003 | Kheirolomoom et al. |
| 2003/0005181 A1 | 1/2003 | Bau, III et al. |
| 2003/0014439 A1 | 1/2003 | Boughannam |
| 2003/0018661 A1 | 1/2003 | Darugar |
| 2003/0018665 A1 | 1/2003 | Dovin et al. |
| 2003/0018832 A1 | 1/2003 | Amirisetty et al. |
| 2003/0018963 A1 | 1/2003 | Ashworth et al. |
| 2003/0023957 A1 | 1/2003 | Bau, III et al. |
| 2003/0028364 A1 | 2/2003 | Chan et al. |
| 2003/0028579 A1 | 2/2003 | Kulkarni et al. |
| 2003/0041198 A1 | 2/2003 | Exton et al. .................. 710/200 |
| 2003/0043191 A1 | 3/2003 | Tinsley et al. |
| 2003/0046266 A1 | 3/2003 | Mullins |
| 2003/0046591 A1 | 3/2003 | Asghari-Kamrani et al. |
| 2003/0051066 A1 | 3/2003 | Pace et al. |
| 2003/0055868 A1 | 3/2003 | Fletcher et al. |
| 2003/0055878 A1 | 3/2003 | Fletcher et al. |
| 2003/0074217 A1 | 4/2003 | Beisiegel et al. |
| 2003/0079029 A1 | 4/2003 | Garimella et al. |
| 2003/0110117 A1 | 6/2003 | Saidenberg et al. |
| 2003/0110446 A1 | 6/2003 | Nemer |
| 2003/0126136 A1 | 7/2003 | Omoigui |
| 2003/0149791 A1 | 8/2003 | Kane et al. |
| 2003/0167358 A1 | 9/2003 | Marvin et al. |
| 2003/0196168 A1 | 10/2003 | Hu |
| 2004/0019645 A1 | 1/2004 | Goodman et al. |
| 2004/0040011 A1 | 2/2004 | Bosworth et al. |
| 2004/0046789 A1* | 3/2004 | Inanoria ..................... 345/748 |
| 2004/0078373 A1 | 4/2004 | Ghoneimy et al. |
| 2004/0103406 A1 | 5/2004 | Patel |
| 2004/0133660 A1 | 7/2004 | Junghubert et al. |
| 2004/0148336 A1 | 7/2004 | Hubbard et al. |
| 2004/0204976 A1 | 10/2004 | Oyama et al. |
| 2004/0216086 A1 | 10/2004 | Bau |
| 2004/0225995 A1 | 11/2004 | Marvin et al. |
| 2004/0260715 A1 | 12/2004 | Mongeon et al. |
| 2005/0050068 A1 | 3/2005 | Vaschillo et al. |
| 2005/0278585 A1 | 12/2005 | Spencer |
| 2006/0041893 A1* | 2/2006 | Castro et al. ................. 719/320 |
| 2006/0206856 A1 | 9/2006 | Breeden et al. |
| 2006/0234678 A1 | 10/2006 | Juitt et al. |
| 2007/0038500 A1 | 2/2007 | Hammitt et al. |

OTHER PUBLICATIONS

Kunisetty, Workflow Modeling and Simulation Using an Extensible Object-Oriented Knowledge Base Management System, CiteSeer, 1996, pp. 1-60, entire reference.

Van Der Aalst et al, Verification of XRL: An XML-Based Workflow Language, IEEE, Jul. 2001, pp. 427-432, entire reference.

Blake, Rule-Driven Coordination Agents: A Self-Configurable Agent Architecture for Distributed Control, IEEE, Mar. 2001, pp. 271-277, entire reference.

Dahalin et al, Workflow Interoperability Using Extensible Markup Language (XML), IEEE, Jul. 2002, pp. 513-516, entire reference.

International Search Report PCT/US04/05488, mailed Mar. 1, 2005, 3 sheets.

Mariucci, Marcello. "Enterprise Application Server Development Environments.", Overview. University of Stuttgart. Oct. 10, 2000, p. 1-10.

Sun Microsystems. "IPlanet Application Server 6.0 White Paper.", Technical Reference Guide. May 25, 2000, all, fig. on p. 20.

Roman, Ed and Rickard Oberg, "The Technical Benefits of EJB and J2EE Technologies over COM+ and Windows DNA." Dec. 1999, pp. 3-5, fig. 1.

Hewlett-Packard. "HP Application Server." technical guide version 8.0. 1999-2001, all.

Duvos, Enrique and Azer Bestavros. "An Infrastructure for the Dynamic Distribution of Web Applications and Services." Department of Computer Science, Boston University. Dec. 2000, pp. 4-12.

Paul, Laura Gibbons, "RosettaNet: Teaching Business to Work Together", Oct. 1, 1999. http://www.developer.com/sml/article.php/616641.

"Introducing Microsoft DotNet", by Christophe Lauer, Jul. 2, 2002, http://webarchive.org/web/20020702162429/http://www.freevbcode.com/ShowCode.as;?ID=2171.

Tang, et al., "Integrating Remote Invocation and Distributed Shared State," Proceedings of the 18th International Parallel and Distributed Processing Symposium, (IPDPS '04), Apr. 26-30, 2004, 10 pages.

Mays, et al., "A Persistent Store for Large Shared Knowledge Bases," IEEE Transactions on Knowledge and Data Engineering, vol. 3, No. 1, Mar. 1991, pp. 33-41.

Embury, et al., "Assisting the Comprehension of Legacy Transactions," Proceedings of the Eighth Working Conference on Reverse Engineering, Oct. 2-5, 2001, IEEE, pp. 345-354.

Kilgore, "Multi-Language, Open-Source Modeling Using the Microsoft .NET Architecture," Proceedings of the 2002 Winter Simulation Conference, Dec. 8-11, 2002, IEEE, vol. 1, pp. 629-633.

Java Debug Interface—definition, retrieved from <URL http://java.sun.com/j2se/1.4.2/docs/guide/jpda/jdi/overview-summary.html on Feb. 21, 2007, pp. 1-3.

HP, "HP Application Server", Developer's Guide, Version 8.0, 1999-2001, pp. 27-81, 127, 160, 195-271.

Liebmann, "Adaptive Data Dissemination and Caching for Edge Service Architecture Built with the J2EE", 2004 ACM Symposium on Applied Computing, Mar. 2004, pp. 1717-1724, ACM Press.

Sosnoski, "XML and Java technologies: Data binding, Part 1: Code generation approaches—JAXB and more," IBM, Jan. 1, 2003, http://www-128.ibm.com/developerworks/library/x-databdopt/index.html, pp. 1-11.

Bogunvic, N, "A Programming Model for Composing Data-Flow Collaborative Applications", IEEE Mar. 1999, 7 pages.

Sung, S.Y., et al., "A Multimedia Authoring Tool for the Internet", IEEE 1997, pp. 304-308.

Smith, M., et al., "Marching Towards a Software Reuse Future", ACM Ada Letters, Nov./Dec. 1994, vol. XIV, No. 6, pp. 62-72.

Muller, "Event-Oriented Dynamic Adaptation of Workflows Model, Architecture, and Implementation," 2002, University of Leipzig, Germany, pp. i-viv, 1-342.

Peltz, "Web Service Orchestration," HP, Jan. 2003, Hewlett Packard, Co., pp. 1-20.

Mohan, C. et al., "ARIES: a transaction recovery method supporting fine-granularity locking and partial rollbacks using write-ahead logging," ACM Transactions on Database Systems (TODS), vol. 17, Issue 1 (Mar. 1992), pp. 94-162.

BEA, Transforming Data Using Xquery Mapper, 2006, BEA AquaLogic Service Bus 2.0 Documentation, pp. 1-19.

Stylus Studio, Xquery Mapper, 2007, Stylus Studios, pp. 1-6.

Altova, XML-to-XML Mapping, 2007, Altova, pp. 1-3.

Jamper, Jamper-Java XML Mapper, 2007, Sourceforge, pp. 1-4.

Alonso, G. et al., "Advanced Transaction Models in Workflow Contexts," Feb. 1996, Proceedings of 12th International Conference on Data Engineering, retrieved from http://citeseer.ist.psu.edu/alonso96advanced.html, 8 pages.

Van Der Aalst, W.M.P. et al., "XML Based Schema Definition for Support of Inter-Organizational Workflow," 2000, University of Colorado and University of Eindhoven report, retrieved from http://citeseer.ist.psu.edu/vanderaalst00xml.html, pp. 1-39.

Plaindoux, Didier, "XML Transducers in Java," May 2002, The Eleventh International World Wide Web Conference, retrieved from http://www.2002.org/CDROM/poster/132/index.html, pp. 1-6.

Microsoft, "Microsoft.net Framework," 2001, Microsoft Corporation, pp. 1-50.

Willink, Edward D., "Meta-Compilation for C++," Jan. 2000, University of Surrey, p. 362.

* cited by examiner

SYSTEM AND METHOD FOR DESCRIBING APPLICATION EXTENSIONS IN XML

CLAIM OF PRIORITY

This application claims priority from the following application, which is hereby incorporated by reference in its entirety:

EXTENSIBLE INTERACTIVE SOFTWARE DEVELOPMENT ENVIRONMENT, U.S. Application No. 60/451,340, Inventors: Ross Bunker et al., filed on Feb. 28, 2003.

CROSS-REFERENCE TO RELATED APPLICATIONS

This application is related to the following co-pending applications which are each hereby incorporated by reference in their entirety:

SYSTEM AND METHOD FOR MULTI-LANGUAGE EXTENSIBLE COMPILER FRAMEWORK, U.S. application Ser. No. 10/782,715, Inventors: Kevin Zatloukal, filed on Feb. 19, 2004.

SYSTEMS AND METHODS FOR MULTI-LANGUAGE DEBUGGING, U.S. Application No. 60/450,014, Inventors: William Pugh et al., filed on Feb. 26, 2003.

SYSTEMS AND METHODS FOR MULTI-VIEW DEBUGGING ENVIRONMENT, U.S. Application No. 60/451,368, Inventors: Josh Eckels et al., filed on Mar. 1, 2003.

SYSTEMS AND METHODS FOR TYPE-INDEPENDENCE SOURCE CODE EDITING, U.S. Application No. 60/449,984, Inventors: Britt Piehler et al., filed on Feb. 26, 2003.

MULTI-THREADED MULTI-LANGUAGE COMPILER FRAMEWORK, U.S. Application No. 60/488,629, Inventors: Kevin Zatloukal, filed on Jul. 19, 2003.

EXTENDABLE COMPILER FRAMEWORK, U.S. application Ser. No. 10/951,315, Inventors: Kevin Zatloukal, filed on Sep. 27, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present invention disclosure relates to an extensible interactive development environment.

BACKGROUND

Typical interactive applications provide for operating on a fixed set of file types where the file contains a single type of content. Increasingly, applications require the use of files that contain many different kinds of interleaved content or code in different programming languages. Moreover, the frequency with which new types of content and programming languages become available is increasing rapidly. These factors require a new kind of interactive application that can be dynamically configured.

DETAILED DESCRIPTION

The invention is illustrated by way of example and not by way of limitation in the figures of the accompanying drawings in which like references indicate similar elements. It can be noted that references to "an" or "one" embodiment in this disclosure are not necessarily to the same embodiment, and such references mean at least one.

In one embodiment, a generic interactive application (GIA) can be dynamically configured and functionally extended by defining it in terms of interchangeable building blocks called extensions. By way of a non-limiting example, extensions can provide new graphical user interface (GUI) components, new project/file types, and new application functionality. An example of a GIA is WebLogic® Workshop, an interactive software development environment available from BEA Systems, Inc. of San Jose, Calif.

Figure 1:
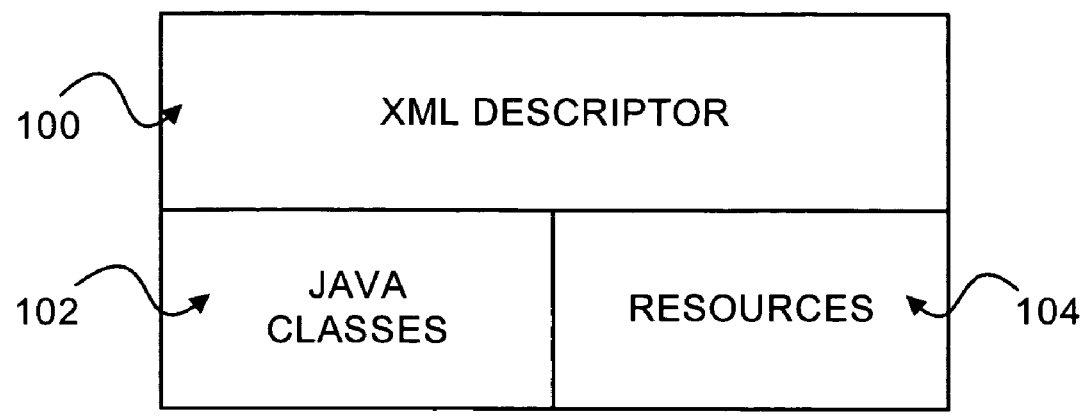
FIG. 1 is an exemplary illustration of an interactive application extension component in an embodiment.

FIG. 1 is an exemplary illustration of an interactive application extension component in an embodiment. In one embodiment, an extension can include an XML (Extensible Markup Language) descriptor 100 ("extension.xml"), an optional set of classes defined in an object-oriented programming language (e.g., Java™, C#, C++, or another suitable language) 102 that can expose interfaces and consume services, and optional resources 104 (e.g., images, text strings, sounds, and any other suitable resource). An extension's components can be packaged together in an archive as a file (e.g., a JAR Java™ Archive), a directory or any combination thereof. For complex extensions, a JAR file can contain the code that is the extension's implementation, a manifest file which defines the class path, and attributes that reference dependent JARs that need to be available at run time by the extension.

Figure 2:
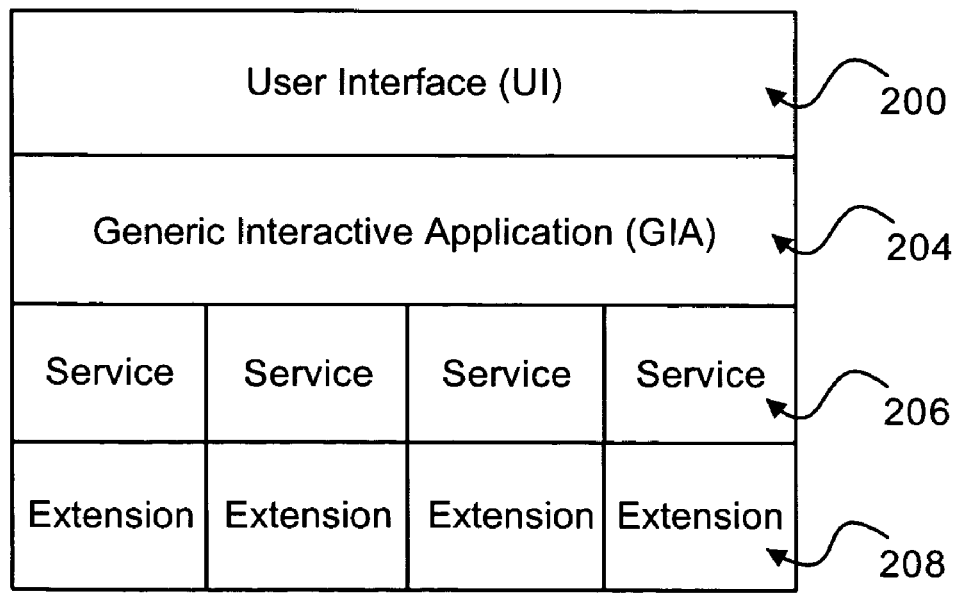
FIG. 2 is an exemplary illustration of a generic interactive application in an embodiment.

FIG. 2 is an exemplary illustration a generic interactive application in an embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In one embodiment, a GIA 204 includes a user interface (UI) 200 and a set of services 206. The GIA and its services can make use of and extend the functionality of, the UI. By way of a non-limiting example, the UI can include one or more of the following: 1) a graphical user interface (GUI) (e.g., rendered with Hypertext Markup Language); 2) an ability to respond to sounds and/or voice commands; 3) an ability to respond to input from a remote control device (e.g., a cellular telephone, a PDA, or other suitable remote control); 4) an ability to respond to gestures (e.g., facial and otherwise); 5) an ability to respond to commands from a process on the same or another computing device; and 6) an ability to respond to input from a computer mouse and/or keyboard.

This disclosure is not limited to any particular UI. Those of skill in the art will recognize that many other UI embodiments are possible and fully within the scope and spirit of this disclosure.

Each service can be associated with an extension 208. An extension can expose and consume the services of other extensions. In one embodiment, a service is a public interface that has an implementation and provides access to functionality in an extension. An extension may declare services that it implements. For instance, a debugger extension can define a debugger service that, among other things, provides a method for setting a breakpoint in a program source file. Services can be consumed by an extension's classes and can be registered with the system using tags in the extensions.xml file.

In one embodiment, at startup a GIA run-time component can read all extension.xml files, batch them together and ensure that the services requested by each are available. Extensions may define handlers for an <extension-xml> tag found in the extension.xml file. Handlers are associated with a particular id attribute. In one embodiment, an extension.xml file can be scanned for code fragments contained within a <extension-xml> tag and those fragments can be passed to handlers defined for the particular id attribute at run-time. This mechanism allows extensions to create extendable infrastructure in which other extensions can participate. In one embodiment, a handler class can be instantiated by the GIA and is responsible for parsing XML contained in a fragment.

Figure 3:
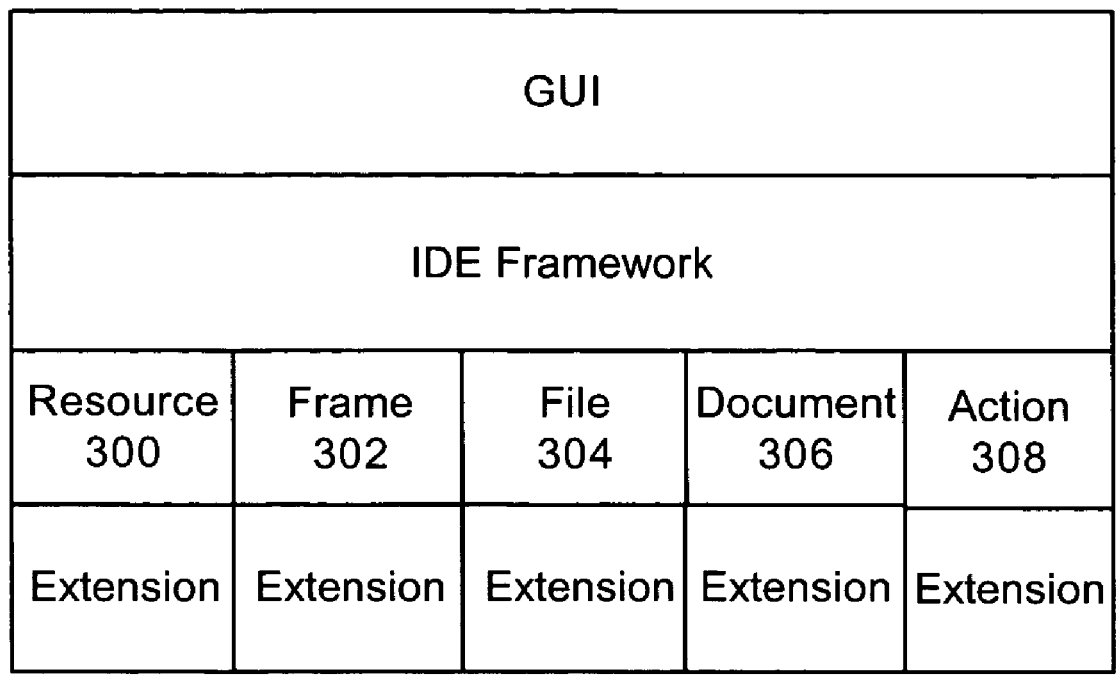
FIG. 3 is an exemplary illustration of services in an embodiment.

FIG. 3 is an exemplary illustration of a services in an embodiment. In one embodiment and by way of a non-limiting example, services can include: a resource service 300 to provide access to resources such as icons, images, and localizable strings; a frame service 302 to allow extensions to specify a GUI docking layout; a file service 304 that can provide a set of services for file system access and manipulation; a server service (not shown) to provide a set of services for accessing a server; a document services 306 to provide a means to supply an abstract document interface for files that are part of the application project; and an action service 308 to provide methods for adding and manipulating menu and toolbar items.

In one embodiment, the root element for the XML in the extension.xml file is <extension-definition>. An <extension-definition> element may have one or more <extension-xml> elements as children, each describing a different extension. The particular type of extension can be described by setting the value of the <extension-xml> element's id attribute. Exemplary values for the id attribute are given in Table 1.

By way of a non-limiting example, the following XML describes an extension that adds three GUI panels for setting properties in a GIA: one for a Project Properties dialog, one for an Application (workspace) Properties dialog, and one for a GIA Properties dialog:

```
    <extension-definition>
        <extension-xml id="urn:com:settings">
            <project-preferences>
                <panel
label="%strings.workshop.debugger.extension.debuggerTab%"
class="workshop.debugger.ui.DebuggerPreferencesPanel"/>
            </project-preferences>
            <workspace-preferences>
                <panel
label="%strings.workshop.debugger.extension.debugSourcepath%"
class="workshop.debugger.ui.DebugSourcepathPreferences"
priority="40"/>
            </workspace-preferences>
            <GIA-preferences>
                <panel
```

-continued

```
label="%strings.workshop.debugger.extension.debuggerViews%"
class="workshop.debugger.ui.ExpressionViewPreferences"/>
            </GIA-preferences>
        </extension-xml>
    </extension-definition>
Syntax:
    <extension-xml id="urnForExtensionType">
        <!-- Extension-specific XML. -->
    </extension-xml>
Parents:
    <extension-definition>
Children:
    <file-extension>, <create-template>, <project-attributes>
```

Multiple <extension-xml> elements may occur as children of the <extension-definition> element, which is the root element of an extension.xml file.

TABLE 1

Exemplary Extension Types in an Embodiment

| EXTENSION TYPE | EXTENSION DESCRIPTION | ID ATTRIBUTE SET TO |
|---|---|---|
| Document | Defines support for a document type. | urn:com:document |
| Actions | Defines menus, popups, and toolbars, along with their associated behavior. | urn:com:actions |
| Encoding | Defines support for a file type. | urn:com:encoding |
| Frame | Defines a frame view (e.g., a dockable window). | urn:com:frame |
| Help | Defines paths to search for help topics when context-sensitive help is requested. | urn:com:help |
| Settings | Defines a new properties panel. | urn:com:settings |
| Project | Defines a new project type. | urn:com:project |
| Debugger | Defines a new debugger variable view. | urn:com:debugExpressionViews |

In one embodiment, the <action-ui> element can specify UI details for actions in a GIA. In general, this element can be used for defining new UI elements (e.g., menu and popup commands, toolbar buttons, etc.) associated with actions. By way of a non-limiting example:

```
            <extension-xml>
                <action-ui>
                    <action-group>
                        <menu>
                        <menu>
                            <action-group>
                        <popup>
                            <action-group>
                        <toolbar>
                            <action-group>
                    <action-set>
                        <action>
                            <location>
Syntax:
    <action-ui>
        <!-- Children that describe specific actions or groups of
    actions. -->
    </action-ui>
```

In one embodiment, a <menu> element can be used to specify a UI menu item. Attributes for this element are provided in Table 3. By way of a non-limiting example:

```
<extension-xml>
    <action-ui>
        <action-group>
            <menu>
<extension-xml>
    <action-ui>
        <menu>
Syntax:
    <menu
        id="nameToUseInContextPaths"
        label="labelInGIA"
        [path="uiContextPath"]
        priority="priorityNumber"
    >
Parents:
    <action-ui>, <action-group>
Children:
    <action-group>
```

TABLE 2

Exemplary <menu> Element Attributes in an Embodiment

| ATTRIBUTE | DESCRIPTION |
| --- | --- |
| id | The name of this menu item. The full context for this action item can be determined by combining this attribute with the path attribute. |
| label | The text to display for the menu in the GIA. A programmer can also indicate the action's default key-stroke accelerator by preceding it with '@'. If the label begins and ends with the '%' escape character, the label can be interpreted as a Java ™ PropertyBundle path. The label (including accelerator) will be determined by using the ResourceSvc to load the property named by the path. Place '&' before the character which is to be the menu mnemonic. |
| path | Optional string. A path through the UI hierarchy, followed by the final group in the last menu. For example, "menu/services/controls/add" would locate an action in the "add" group, of the "controls" sub-menu, of the "services" menu, in the main menu. Use the id attribute to specify the name of the menu item beneath "add". |
| priority | This item's GUI priority. |

In one embodiment, <action-group> adds a new action group to a 'View' menu. Action groups (and all other UI elements) are sorted with lowest priority numbers first. An action group is simply a place to put actions. If no actions are put in the action group, then it will not be visible in the UI. A separator can be shown between each visible command group. In one embodiment, a default priority can be provided. In another embodiment, a priority can be specified.

```
Syntax:
    <action-group priority="priorityNumber">
Parents:
    <action-ui>
Children:
    <menu>, <action-ref>
```

In one embodiment, a <popup> element specifies a UI popup window or menu. The <popup> element's attributes are provided in Table 3.

```
<extension-xml>
    <action-ui>
        <popup>
Syntax:
    <popup
        id="nameToUseInContextPaths"
        path="uiContextPath"
    >
Parents:
    <action-ui>
Children:
    <action-group>
```

TABLE 3

Exemplary <popup> Element Attributes in an Embodiment

| ATTRIBUTE | DESCRIPTION |
| --- | --- |
| id | The name of this item. The full context for this action item can be determined by combining this attribute with the path attribute. |
| path | A path through the UI hierarchy, followed by the final group in the last menu. For example, "menu/services/controls/add" would locate an action in the "add" group, of the "controls" sub-menu, of the "services" menu, in the main menu. Use the id attribute to specify the name of the menu item beneath "add". |

In one embodiment, a <toolbar> element can specify a UI toolbar or toolbar button. Its attributes are specified in Table 4.

```
Syntax:
    <toolbar
        id="nameToUseInContextPaths"
        label="labelInGIA"
        [path="uiContextPath"]
        priority="priorityNumber"
    >
Parents:
    <action-ui>
Children:
    <action-group>
```

TABLE 4

Exemplary <toolbar> Element Attributes in an Embodiment

| ATTRIBUTE | DESCRIPTION |
| --- | --- |
| id | The name of this item. The full context for this action item can be determined by combining this attribute with the path attribute. |
| label | The text to display for the menu in the GIA. A programmer can also indicate the action's default key-stroke accelerator by preceding it with '@'. If the label begins and ends with the '%' escape character, the label is interpreted as a Java PropertyBundle path. The |

TABLE 4-continued

Exemplary <toolbar> Element Attributes in an Embodiment

| ATTRIBUTE | DESCRIPTION |
|---|---|
|  | label (including accelerator) will be determined by using the ResourceSvc to load the property named by the path. Place '&' before the character which is to be the menu mnemonic. |
| path | Optional string. A path through the UI hierarchy, followed by the final group in the last menu. For example, "menu/services/controls/add" would locate an action in the "add" group, of the "controls" sub-menu, of the "services" menu, in the main menu. Use the id attribute to specify the name of the menu item beneath "add". |
| priority | Required int. |

In one embodiment, an <action-set> element can specify actions in an extension. It may occur multiple times as a child of <extension-xml>. Specific actions, such as a menu or popup command, or a toolbar button, are described by each <action> child element.

```
Syntax:
    <action-set
        scope="classNameForView"
        extends="classNameForExtendedView"
    >
Parents:
    <extension-xml>
Children:
    <action>
```

TABLE 5

Exemplary <action-set> Attributes in an Embodiment

| ATTRIBUTE | DESCRIPTION |
|---|---|
| scope | Optional string. The fully-qualified class name for a view (a document, document view or frame view) that is active in order for this action to be available. Default is global scope, meaning that the actions in this set may be accessible to the user regardless of the active view. |
| extends | Optional string. The fully-qualified class name for a view whose scope this action set extends. Extending an action-set of an existing scope adds all the actions of the base scope into the extending scope. |

In one embodiment, an <action> element can specify a UI action, such as a menu or popup command, or a toolbar button. Attributes for this element are provided in Table 6.

```
Syntax:
    <action
        [class="classNameForHandler"]
        [label="menuText"]
        [tooltip="tooltipText"]
        [icon="pathToGifFile"]
        [id=""]
    >
Parents:
    <action-set>
Children:
    <location>
```

TABLE 6

Exemplary <action> Element Attributes in an Embodiment

| ATTRIBUTE | DESCRIPTION |
|---|---|
| class | Optional string. The fully-qualified class name for the class that defines this action. In one embodiment, the class can have a parameter-less constructor and implement an IAction interface. By way of a non-limiting example, this interface can be a fairly simple extension of Swing's own ActionListener interface. The interface can also implement a listener to allow the action to respond to property changes and update its state. IAction Method Summary: void actionPerformed(ActionEvent) Invoked when an action occurs. void propertyChange(PropertyChangeEvent) Updates the state of this action using the given property change event. |
| label | Optional string. The text to display for this action in menus. Place '&' before the character which is to be the menu mnemonic. A programmer can also indicate the action's default key-stroke accelerator by preceding it with '@'. If the label begins and ends with the '%' escape character, the label is interpreted as a Java PropertyBundle path. The label (including accelerator) will be determined by using the ResourceSvc to load the property named by the path. |
| tooltip | Optional string. The text to show as a tool tip for a toolbar, in status bar for menus, or in customization dialogs. |
| icon | Optional string. A path to an image resource to show on toolbars and menus. |
| id | Optional string. |

In one embodiment, a <location> element specifies a location in a GIA user interface (such as an existing menu group) where an action can be placed. This element is provided as a convenience for simple cases. In general, a programmer can define new user interface for actions with <action-ui> elements.

```
Syntax:
    <location path="path">
Parents:
    <action>
Children:
    None.
```

In one embodiment, a <view> element allows the specification of new debugger variable view. The following non-limiting example uses the XmlExpressionView view implementation for a view of a string variable:

```
    <extension-xml id="urn:com:debugExpressionViews">
        <view
            priority="80"
            valueType="java.lang.String"
            description="View as XML"
            class="workshop.debugger.ui.expressionview.XmlExpressionV
iew"/>
    </extension-xml>
Syntax:
    <view
        class="viewImplementation"
        description="viewDescriptionInGIA"
        matchesNulls="true | false"
        priority="rankingAmongViews"
        valueType="typeWhoseDataThisIsAViewFor"
    >
Parents:
    <extension-xml>
Children:
    <view>
```

TABLE 7

Exemplary <view> Element Attributes in an Embodiment

| ATTRIBUTE | DESCRIPTION |
|---|---|
| class | The fully-qualified name of the class that provides the custom view. In one embodiment, this class can implement an IDebugExpressionView interface. This interface is responsible for displaying, editing, and populating the children of an expression in locals and watch windows of a GIA debugger. Watch windows can add, remove, or completely specify which fields to show, and provide custom renderers and editors for its values. Implementing classes class can have a argument-less constructor, as they can be instantiated using Class.newInstance( ). Mappings between types and which views they should use can be specified in extension.xml. Views can also used to render the hovering value tooltip in the source editor when debugging. The default view is always used for these tooltips. When inserting a view, it can be first instantiated using Class.newInstance( ), then init( ) is called, and it is then added to its parent in the tree. If there are exceptions thrown when instantiating a debugger view, they can be logged to a file, and the matching view with the next highest priority can be instantiated. Common causes of problems include classpath issues that prevent the class from being found by the classloader, not having a public argument-less constructor, or having an exception thrown in the view's constructor. |
| description | The description to display for the view when the user right-clicks. |
| priority | A number indicating this view's ranking among views for variables of this type. |
| valueType | The fully-qualified name of the type to provide this view for. |

In one embodiment, a <document-handler> element describes a document extension, with which a programmer can add to the GIA to support new document types. New document types may require a specific user interface (such as an icon) and behavior. The extension.xml file for a document extension can specify the class to use for handling the new type of document, the document's file extension, and so on.

```
Syntax:
    <document-handler
        class="handlerClassName"
        icon="pathToIcon"
        label="descriptiveTextForDocumentType"
    >
Parents:
    <extension-xml>
Children:
    <file-extension>, <create-template>, <project-attributes>
```

TABLE 8

Exemplary <document-handler> Element Attributes in an Embodiment

| ATTRIBUTE | DESCRIPTION |
|---|---|
| class | The fully-qualified name of the handler class for this document type. In one embodiment, the specified class can implement an IDocumentHandler interface. The IDocumentHandler is a basic interface that the document service can use to map a URI to an IDocument interface. Handlers are registered with the IDE at startup using extension.xml. The extension XML allows the specification of a set of project attributes that can be used to limit the scope of a document handler to specific sets of projects. Attributes may be required by the handler on the project that contains a document it opens. |
| icon | Path to an image that can be used to represent this file type. This will be used, for example, to allow the Application window to display an image next to the file name. |
| label | A plain text description of this file type. This will be used as explanatory text where appropriate. |

In one embodiment, the <document-handler> element may have one or more <file-extension> child elements. These can be used to specify the extension of a file for which this document handler may be used. Attributes are discussed in Table 9.

```
Syntax:
    <file-extension
        priority="prioritySetting"
        [handler="handlerName"]
    >
```

-continued

```
Parents:
    <document-handler>
Children:
    None
```

TABLE 9

Exemplary <file-extension> Element Attributes in an Embodiment

| ATTRIBUTE | DESCRIPTION |
|---|---|
| priority | The ranking of the handler for this file extension. The priority attribute captures a relative ranking of how well the handler understands this particular extension. A document service can use this to find a default handler for a given file extension. It will choose the handler with the highest priority. In the event of a tie, one of the handlers with the highest priority can be arbitrarily chosen. Possible values are: lowest, low, medium, high, highest, unknown and info-only. A value of "unknown" indicates that the handler can actually inspect the contents of the file in order to determine what priority it actually has. A value of "info-only" indicates that the handler does not possess any knowledge of the contents of the file, but merely provides an icon and description. |
| handler | Optional string. In one embodiment, an "unknown" priority value indicates that the handler can actually inspect the contents of a file in order to determine what priority it actually has. By way of a non-limiting example, imagine a Dialog editor that understands files Java ™ files, but only if the class extends the JDialog class. If no "highest" handler is available for a file at run time, "unknown" handlers can be given the opportunity to inspect the file and return one of the six more specific priority values. The highest priority among the "unknown" type handlers and any remaining non-"highest" handlers will be designated as the default handler for a file. |

In one embodiment, a programmer will most often implement "highest" priority handlers, but a programmer may also have "low" and "medium" priority handlers. For example, the extension .java can have a high priority handler that handles JAVA files. However, the extension .jws is also a JAVA file. In the absence of a "highest" priority handler for it (in other words, the web services extension), the JAVA file handler can be able to also handle JWS files. Therefore, the JAVA file handler may declare itself to be a "low" priority handler for files with a jws extension.

In one embodiment, a <create-template> element can specify information used in a right-click UI menu and/or a New File dialog when creating a new file of this type.

```
Syntax:
    <create-template
        [id="id"]
        priority="priorityNumber"
        [createCategories="fileCategories"]
        [label="descriptiveText"]
    >
Parents:
    <document-handler>
Children:
    <description>
```

TABLE 10

Exemplary <create-template> Element Attributes in an Embodiment

| ATTRIBUTE | DESCRIPTION |
|---|---|
| priority | A number indicating this handler's ranking for this file type. |
| label | A plain text description of this file type. This can be used as explanatory text where appropriate. |
| createCategories | Categories in the New File dialog under which this file type will appear. Make this value "ShortCut" to specify that the file type can appear on the right-click menu. |
| id | Optional string. |

In one embodiment, a <description> element can be used to specify text that can appear for this file type in the New File dialog.

```
Syntax:
    <description>
    Description text that appears for file type in the New File
    dialog.
    </description>
Parents:
    <create-template>.
Children:
    None.
```

In one embodiment, an <file-encoding> element can be used to describe a file encoding extension. A programmer can use a file encoding extension to specify how a file can be handled when parsing. By way of a non-limiting example, if a programmer wanted files with an .htm extension to be treated by the GIA in the same way as files with an .html extension, the extension might look as follows:

```
<extension-xml>
    <file-encoding appliesTo="htm" treatAs="html"/>
</extension-xml>
Syntax:
    <file-encoding
        appliesTo="handlerClassName"
        [class="pathToIcon"]
        [treatAs="descriptiveTextForDocumentType"]
    >
Parents:
    <extension-xml>
Children:
    None.
```

TABLE 11

Exemplary <file-encoding> Element Attributes in an Embodiment

| ATTRIBUTE | DESCRIPTION |
|---|---|
| appliesTo | The extension or extensions for files this encoding extension applies to. |
| class | The fully-qualified name of a class to use for handling files with this extension. |
| treatAs | The extension of files whose handler can be used to handle files this encoding extension applies to. |

In one embodiment, a <frame-view-set> can be used to specify one or more UI frame views. A programmer can use the <frame-view> element to define certain appearance and behavior properties for the view in the GIA.

```
Syntax:
    <frame-view-set>
        <!-- frame-view elements to specify new frames -->
    </frame-view-set>
Parents:
    <extension-xml>
Children:
    <frame-view>
```

In one embodiment, a <frame-view> element can describe an extension that adds a dockable frame window to the GIA UI. The extension can provide basic information about the frame, including its label in the UI, its icon in menus, and a class that implements the UI and behavior for the frame. In addition, a programmer can use an <application-layout> element to specify that frames can be visible in specific positions at startup.

```
Syntax:
    <frame-view
        askavailable="true | false"
        class="classNameForViewImplementation"
            [hasaction="true | false"]
            [icon="pathToGifFile"]
            [id="identifierForThisView"]
            label="labelToDisplayInUI"
        >
Parents:
    <frame-view-set>
Children:
    None.
```

TABLE 12

Exemplary <frame-view> Element Attributes in an Embodiment

| ATTRIBUTE | DESCRIPTION |
|---|---|
| askavailable | Optional boolean. Set to "True" to specify that this view implements an IFrameView, and that its isAvailable( ) method can be called to determine whether the frame can be shown. Implement this interface, or derive from JComponent for all classes specified in the 'class' attribute of a <frame-view> tag. IFrameView's benefits over using a simple JComponent are, that it can provide a 'Component' other than itself, for cases where component construction is more complex, and it can specify the view's 'availability' dynamically. |
| class | The fully-qualified class name of the frame view implementation. the class that is your implementation of the view - its user interface and behavior. A frame view implementation class can extend Component, implement IFrameView, or both. |
| hasaction | True to specify that a menu item for this view cannot be shown in a generated frame view menu. |
| icon | Path to a GIF file that can be used to represent this view in menus. |
| id | An identifier to distinguish between multiple instances of the implementation class. |
| label | The label used in the view tab, and in the View menu. |

In one embodiment, an <application-layout> element can specify parameters for frame layouts, or descriptors that specify startup positions for frame views. This element can be used to create multiple frame views in the GIA UI.

```
Syntax:
    <application-layout
        id="layoutInWhichTheseLayoutsShouldAppear"
        >
Parents:
    <extension-xml>
Children:
    <frame-layout>
```

TABLE 13

Exemplary <application-layout> Element Attributes in an Embodiment

| ATTRIBUTE | DESCRIPTION |
|---|---|
| id | Identifier for the application layout to which this element's children can be applied. In one embodiment, valid values include "main" and "urn:com:debug". |

In one embodiment, a <frame-layout> element can specify the parameters of a layout, or the specific positions of one or more frame views at GIA startup.

```
Syntax:
    <frame-layout
        id="frameLayoutID"
        >
Parents:
    <application-layout>
Children:
    <frame-container>
```

TABLE 14

Exemplary <frame-layout> Element Attributes in an Embodiment

| ATTRIBUTE | DESCRIPTION |
|---|---|
| id | Id of the frame layout to which the children can be applied. The valid value is "main". |

In one embodiment, a <frame-container> element can specify layout parameters for a group of frame view windows. This element can be used when there are two or more frame views that can appear in specific positions relative to each other at startup.

```
Syntax:
    <frame-container
        [orientation="orientationInGIA"]
        proportion="percentageOfGIASpace"
        >
Parents:
    <frame-layout>
Children:
    <frame-view-ref>, <frame-container>.
```

TABLE 15

Exemplary <frame-container> Element Attributes in an Embodiment

| ATTRIBUTE | DESCRIPTION |
|---|---|
| orientation | This container's orientation in the layout. Valid values are "tabbed", "root", "north", "south", "west", or "east". Valid only on the root <frame-container> in a <frame-layout> element. |
| proportion | The percentage of space that this container can occupy in the GIA. For example, a container oriented "south" with a proportion of "25%" would occupy the lower 25 percent of the GIA. As with HTML tables, proportions need not add up to 100 percent. |

In one embodiment, a <frame-view-ref> element can specify a frame view to appear in a container. Within the <frame-container> element, which defines layout parameters, the <frame-view-ref> element specifies details about the frame itself.

```
Syntax:
    <frame-view-ref
        class="frameViewImplementationClass"
        [id="frameLayoutID"]
        [proportion="percentageOfContainerSpace"]
        [visible="true | false"]
    >
Parents:
    <frame-container>
Children:
    None.
```

TABLE 16

Exemplary <frame-view-ref> Element Attributes in an Embodiment

| ATTRIBUTE | DESCRIPTION |
|---|---|
| class | The fully-qualified class name of the frame view implementation. |
| id | An identifier to distinguish between multiple instances of the implementation class. |
| proportion | The percentage of space that this container can occupy in the container. For example, a container oriented "south" with a proportion of "25%" would occupy the lower 25 percent of the GIA. As with HTML tables, proportions need not add up to 100 percent. |
| visible | Boolean: false to hide this frame on startup. |

In one embodiment, the <help-root> describes a help extension through which a programmer can specify paths that can be added to the locations searched by the GIA when context-sensitive help is requested. By way of a non-limiting example, when a user presses an F1 key, a context-sensitive help engine can search for a topic (e.g., an HTML file) that corresponds to the user's current context (such as Source View, with the cursor positioned in a class variable name).

```
Syntax:
    <help-root
        dir="pathRelativeToParent"
        parent="parentForHelpPaths"
        url="urlToHelpRoot"
    >
Parents:
    <extension-xml>
Children:
    None.
```

TABLE 17

Exemplary <help-root> Element Attributes in an Embodiment

| ATTRIBUTE | DESCRIPTION |
|---|---|
| dir | Optional string. The directory to search as a help root. This directory is relative to the value specified in the parent attribute. |
| parent | Optional string. A path to a JAR file or directory relative to the WebLogic Workshop extensions directory. An absolute path may be used, but it is not recommended. If this attribute is omitted, the directory is assumed to be in the extension's own JAR file or directory. |
| url | Optional string. An absolute URL that specifies a new help root. This may be any URL, but will typically be HTTP or file based. Set this attribute's value as an alternative to setting the dir and parent attribute values. |

In one embodiment, a <GIA-preferences> element can describe a preferences extension, which can add one or more panels to the GIA properties dialogs. These dialogs can include GIA Properties, Project Properties, and Application Properties (also known as "workspace properties"). For each of these dialogs, a programmer can specify one or more panels with the <panel> child element.

```
Syntax:
    <GIA-preferences>
        <!-- panel elements that define user interface for the
        properties panel -->
    </GIA-preferences>
Parents:
    <extension-xml>
Children:
    <panel>
```

In one embodiment, a <workspace-preferences> element can specify one or more panels that can be included in the Application Properties dialog.

```
Syntax:
    <workspace-preferences>
        <!-- panel elements that define user interface for the
        properties panel -->
    </workspace-preferences>
Parents:
    <extension-xml>
Children:
    <panel>
```

In one embodiment, a <project-preferences> element can specify one or more GUI panels that can be included in the Project Properties dialog.

```
Syntax:
    <project-preferences>
        <!-- panel elements that define user interface for the
        properties panel -->
    </project-preferences>
```

-continued

```
Parents:
    <extension-xml>
Children:
    <panel>
```

In one embodiment, a <panel> element can specify a panel that can appear in a properties dialog.

```
Syntax:
    <panel
        class="implementationClassName"
        label="labelForThisPanelInDialog"
        [priority="numberForDisplayRanking"]
    >
Parents:
    <GIA-preferences>, <workspace-preferences>, <project-preferences>
Children:
    None.
```

TABLE 18

Exemplary <panel> Element Attributes in an Embodiment

| ATTRIBUTE | DESCRIPTION |
|---|---|
| class | The fully-qualified name of the panel's implementation class. |
| label | The name that can appear in the properties dialog, and which the user clicks to select the panel. |
| priority | Optional int. A number indicating the ranking for this panel in the list of panels. |

In one embodiment, a <project-type> element can specify details related to the project's appearance in the GIA and about a project type file name extension.

```
Syntax:
    <project-type
        id="IdentifierForProjectType"
        closedfoldericon="pathToGifFile"
        icon="pathToIcon"
        label="descriptiveTextForDocumentType"
        openfoldericon="pathToGifFile"
    >
Parents:
    <extension-xml>
Children:
    <attribute>, <driver>
```

TABLE 19

Exemplary <project-type> Element Attributes in an Embodiment

| ATTRIBUTE | DESCRIPTION |
|---|---|
| id | An identifier for this project type. This can be a short name representing this project type -- for example, "php" for a PHP project type. |
| closedfoldericon | The path to the .gif file representing the top-level folder of a project of this type when the folder is closed. |
| icon | The path to the .gif file to use for representing this project type in the UI. |
| label | The text to display for this project type in the New Project dialog. |

TABLE 19-continued

Exemplary <project-type> Element Attributes in an Embodiment

| ATTRIBUTE | DESCRIPTION |
|---|---|
| openfoldericon | The path to the .gif file representing the top-level folder of a project of this type when the folder is open. |

In one embodiment, an <attribute> element can specify an attribute supported by a project type. In one embodiment, project type attributes can correspond to predefined behavior in the GIA. By way of a non-limiting example, specifying "true" for the warnOnXSDAdd attribute tells the GIA that a warning message can be displayed if a GIA user tries to add an XSD file to the project (the warning states that the XSD will not be compiled unless put into a schema project).

```
Syntax:
    <attribute
        name="attributeName"
        value="attributeValue"
    >
Parents:
    <project-type>
Children:
    None.
```

TABLE 20

Exemplary <attribute> Element Attributes in an Embodiment

| ATTRIBUTE | DESCRIPTION |
|---|---|
| name | The name of the attribute whose value is being specified. |
| value | The attribute's value. |

In one embodiment, a <driver> element can specify driver(s) to load when a project of this type is loaded. By way of a non-limiting example, a programmer might want to implement a driver that checks for files added to the project's file system. When the user adds a project of this type to an application, the GIA "attaches" each of the specified drivers to it, so that the driver code is running while the user is working in the application. The project itself need not have focus in order for drivers to be active.

```
Syntax:
    <driver
        class="driverImplementationClass"
        type="driverInterface"
    >
Parents:
    <project-type>
Children:
    None.
```

TABLE 21

Exemplary <driver> Element Attributes in an Embodiment

| ATTRIBUTE | DESCRIPTION |
|---|---|
| class | Required string. The fully-qualified name of the driver implementation. This class can implement the interface specified in the type attribute. |

TABLE 21-continued

Exemplary <driver> Element Attributes in an Embodiment

| ATTRIBUTE | DESCRIPTION |
|---|---|
| type | Required string. The fully-qualified name of the driver interface. |

In one embodiment, a template defines a set of files and/or code to be used to check the contents of or add content to a GIA project. In one embodiment and by way of a non-limiting illustration, the GIA can load its set of templates by finding zip files with a template.xml file at its root located in a 'templates' directory.

In one embodiment, a template.xml file may contain any number of project or application template definitions. A template definition may optionally include display information indicating where and how the template will be displayed to the user. All templates, regardless of whether they contain display information, can be accessed programmatically by extension writers, or be extended or referenced by other template definitions.

In one embodiment, a <template-definition> element is the top-level element for project templates. It can contain any number of <project-template> and <application-template> elements.

Syntax:
    <template-definition>
        <!-- Children <project-template> and <application-template> elements. -->
    </template-definition>
Parents:
    None
Children:
    <project-template>, <application-template>

In one embodiment, a <project-template> element can be used to define a set of content for populating a single new or existing project of a specific project type. A project template can also use a custom template processor class located in an extension JAR to call a GIA extension API, examine and update configuration files, query the user for input, or control the addition of content to a source directory. In one embodiment, project template definitions may be displayed in a New Project Dialog, Import Project Dialog, or in an application tree project-context menu under Install. They may also be extended by other project templates and referenced by application templates.

In one embodiment, a project template can be used by an template processor class to examine, configure or populate a project instance. In one embodiment, a template processor can have two methods: check( ) which determines if the project conforms to the template, and load( ) which configures or adds content to the project. A custom template processor implementation may be specified in the template definition; otherwise the default Workshop implementation will be used.

Syntax
    <project-template
        type="projectType"
        id="projectID"
        [extends="extendedProjectID"]
        [processor="IProjectTemplateProcessor"]
    >
Parents:
    <template-definition>
Children:
    <display>, <content>

TABLE 22

Exemplary <project-template> Element Attributes in an Embodiment

| ATTRIBUTE | DESCRIPTION |
|---|---|
| type | Identifies the type of project that will be created. Project types can be defined in extension.xml and define how the project builds, deploys and runs, as well as how this template will be processed. |
| id | Uniquely identifies this template among all templates defined for its project type. Note that this id does not have to be unique among all project templates. |
| extends | Points to the id of a template of the same project type that this template extends. If this attribute is set, then un-initialized, non-required attributes can be set to values from the extended template. |
| processor | Class name of a template processor implementation. If this attribute is omitted, then a default processor implementation will be created. |

In one embodiment, a <display> element can display options for a New Project dialog.

Syntax:
    <display
        location=" newdialog | importdialog | contextmenu "
        [label="projLabel"]
        [icon="imageName"]
        [description="projDescription"]
        [priority="menuLocationInteger"]
        [categories="projCategory1, projCategory2, ..."]
    >
Parents:
    <project-template>
Children:
    None.

TABLE 23

Exemplary <display> Element Attributes in an Embodiment

| ATTRIBUTE | DESCRIPTION |
|---|---|
| location | Comma separated list of display location identifiers. Workshop-defined values:<br>newdialog - a New Project dialog<br>importdialog - an Import Project dialog<br>contextmenu - a project context menu |
| label | Label that can be displayed in the New Project dialogs. |
| icon | Icon that can be displayed for this template. All project types will specify a default icon which will be used if this attribute is omitted. The value of this attribute may be a GIF file in the template ZIP file, or it may be a resource in an extension JAR file. |
| description | Optional string. Description of this template that will be displayed in the Project dialogs. |

TABLE 23-continued

Exemplary <display> Element Attributes in an Embodiment

| ATTRIBUTE | DESCRIPTION |
| --- | --- |
| priority | Optional integer. Used to order the templates displayed in the dialog template list, higher values being displayed before lower values. |
| categories | Optional string. Comma separated list of template category names. |

In one embodiment, a <content> element can be used to specify a menu item.

```
Syntax:
    <content
        type=" archive | file "
        destination=" project | libraries | modules "
        source="sourceFileOrZIP"
            [overwrite=" true | false "]
    >
Parents:
    <project-template>
Children:
    None.
```

TABLE 24

Exemplary <content> Element Attributes in an Embodiment

| ATTRIBUTE | DESCRIPTION |
| --- | --- |
| type | Indicates how the source file can be processed. Values supported by the default template processor: archive - a zip file file - a file |
| destination | Where the content will be placed. Values supported by the default template processor: project - the root of the project directory libraries - the application Libraries directory modules - the application Modules directory |
| source | The content source file; when opening as a stream, will first look in the template ZIP file, then it try to open the content as a resource. |
| overwrite | Optional boolean. Specifies the behavior if same files already exist in the application directories. If this attribute is omitted, the value is false. The default template processor will immediately quit processing this content element if overwrite is false and a collision occurs. |

In one embodiment, an <application-template> element can be used to define a set of content for populating a new or existing application. An application template can also use a custom template processor class located in an extension jar to call an GIA extension API, examine and update configuration files, query a user for input, or control the addition of content to the application directory. By way of a non-limiting example, application template definitions may be displayed in a New Application Dialog, or in a application tree root context menu under Install. They may also be extended by other application templates and referenced by application templates.

Application templates may also contain any number of content elements, however these content members may only contain application-level data: data in the Libraries, Modules folders, etc. Project content can be specified in a project template. Project templates may be referenced, or they may be completely defined inside the application template. Project templates defined inside the application template will not appear in the New Project and Add Project dialog and may only be used when creating this application.

```
Syntax:
    <application-template
        id="uniqueID"
    >
Parents:
    <template-definition>
Children:
    <display>, <content>, <project-template-ref>
```

TABLE 25

Exemplary <application-template> Element Attributes in an Embodiment

| ATTRIBUTE | DESCRIPTION |
| --- | --- |
| id | Uniquely identifies this application template among all application templates defined in this template zip file. Note that this id does not have to be unique among all application templates loaded by Workshop. |

In one embodiment, a <project-template-ref> element can be used to reference to an externally defined project template. The referenced project template may be defined in the current template ZIP file, or any other template ZIP file in the /template directory. The project type id and template id are used to find the referenced project template. The referenced project template will be used to create a project with the name given and the content defined by the project template.

```
Syntax:
    <project-template-ref
        [default-name="name"]
        [type="projType"]
        [template="projTemplateID"]
    >
Parents:
    <application-template>
Children:
    None.
```

TABLE 26

Exemplary <project-template-ref> Element Attributes in an Embodiment

| ATTRIBUTE | | DESCRIPTION |
| --- | --- | --- |
| default-name | | The name that will be used for the created project. |
| type | A project type id. | Possible values: |
| | TYPE | DESCRIPTION |
| | Datasync | Datasync projects contain server data including campaigns, content, placeholders, content selectors, user segments, and property sets. |
| | Control | Control projects are used to create Java controls and packaging them as JAR files. |
| | WebApp | WebApp projects can contain web applications, web services, and business processes. |
| | EJB | EJB projects are used to create EJBs and packaging them as JAR files. |

TABLE 26-continued

Exemplary <project-template-ref> Element
Attributes in an Embodiment

| ATTRIBUTE | | DESCRIPTION |
|---|---|---|
| | PortalWebApp | A WebApp project that also enables Portals. This can only be added to an portal enabled application. |
| | xbean | Schema project for building XMLBean JARs from schema files (XSD files). |
| template | | A project template id. |

The following is an annotated example of a template.xml file.

```
<template-definition>
<!-- This a Web project template and extends the 'default' Web
project template. -->
    <project-template id="__example__proj1__"
            type="urn:com:project.type:WebApp"
            extends="default"
processor="workshop.workspace.project.TestTemplateProcessor">
        <!-- Defines where and how this template will be
displayed to the Workshop user. -->
        <display
            location="newdialog, importdialog"
            label="__Example Project__"
            description="This project template demonstrates the
Workshop template syntax, and extends the default web project
template. See {wlw__install__dir}/templates/example-template.zip."
            icon="exampleProject.gif"
            priority="0"
            categories="__Example__" />
        <!-- zip to be extracted at the root of the project
directory -->
        <content type="archive" destination="project"
source="default-project.zip"/>
        <!-- file to be put in the libraries directory -->
        <content type="file" destination="libraries"
source="CreditScoreBean.jar" overwrite="true"/>
        <!-- file to be put in the modules directory -->
        <content type="file" destination="modules"
source="CreditScoreEJB.jar" overwrite="true"/>
    </project-template>
    <!-- This a Web project template that will appear in the
Application tree's Install context menu
            when the user right-clicks on a Web project folder.
            Note that this template uses a custom template processor
implementation. This class could
            query the user for input, examine and update existing
configuration files, and control how
            content elements are added to the project. -->
    <project-template id="__example__proj1__installmenu__"
            type="urn:com:project.type:WebApp"
processor="workshop.workspace.project.InstallTemplateProcessor">
        <!-- Defines where and how this template will be
displayed to the Workshop user. -->
        <display
            location="contextmenu"
            label="__Add Project Resources__"
            description="This project template demonstrates the
Workshop template syntax, and extends the default web project
template. See {wlw__install__dir}/templates/example-template.zip."
            icon="exampleProject.gif"
            categories="__Example__" />
        <!-- zip to be extracted at the root of the project
directory -->
        <content type="archive" destination="project"
source="ui__resouces.zip"/>
    </project-template>
<application-template id="__example__app1__">
        <display
            location="newdialog"
            icon="exampleApp.gif"
            label="__Example Application 1__"
            description="This application template demonstrates
the Workshop template syntax. See
{wlw__install__dir}/templates/example-template.zip."
            priority="1"
            categories="__Example__" />
        <!-- zip to be extracted in the libraries directory -->
        <content type="archive" destination="libraries"
source="libraries.zip"/>
        <!-- file to be put in the modules directory -->
        <content type="file" destination="modules"
source="testEJB.jar"/>
        <!-- references a project template defined in another
template zip file -->
        <project-template-ref default-name="__StandardControl__"
type="Control" template="default"/>
        <!-- references a project template defined above -->
        <project-template-ref default-name="__ExampleWebApp__"
type="urn:com:project.type:WebApp" template="__example__proj1__"/>
        <!-- project template only used in this application
template -->
        <project-template default-name="__Example Java__"
                id="__example__app1__proj1__"
                type="Java">
            <content type="file" destination="project"
source="Example.java"/>
        </project-template>
    </application-template>
    <!--
    This application template extends an application template
defined in this
        template zip. Currently we only support extending app
templates defined
        in the same template zip.
    -->
    <application-template id="__example__app2__"
            extends="__example__app1__">
        <display
            location="contextmenu"
            label="__Example Application Content__" />
        <!-- A project template only used in this application
template.
            Extends the default control project -->
        <project-template default-name="__ExampleControl__"
                id="__example__app2__proj1__"
                type="Control"
                extends="default">
            <content type="file" destination="project"
source="Example.java"/>
        </project-template>
    </application-template>
</template-definition>
```

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, nanosystems (including molecular memory integrated circuits), or any type of storage media suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention have been provided for the purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer-readable storage media having stored thereon computer instructions for a computer-based extendable application framework that when executed by a processor cause the instructions to provide:

a user interface;
   a plurality of services, wherein a service includes a public interface that has an implementation and provides access to functionality in an extension of a plurality of extensions;
   said plurality of extensions to extend an application, wherein the plurality of extensions provide functionality accessible in the user interface, wherein each extension in the plurality of extensions include:
   a set of classes defined in an object-oriented programming language,
   an XML (Extensible Markup Language) description, wherein the XML description is scanned for code fragments that are contained within an XML tag and are to be passed to handlers defined for a particular ID attribute at runtime to batch together XML descriptions from other extensions of the plurality of extensions and ensure services requested by the XML description are available,
   an optional set of resources, and
   wherein the extension of the plurality of extensions defines handlers for the XML tag found in the XML description;
   wherein each one of the plurality of services is associated with an extension in the plurality of extensions;
   wherein one of the plurality of extensions exposes and consumes services associated with another extension in the plurality of extensions, wherein the exposed and consumed services are consumed by the set of classes;
   wherein one of the plurality of extensions provides functionality accessible in the user interface;
   wherein one of the plurality of services provides access to functionality in one of the plurality of extensions; and
   wherein the XML description comprises a root element comprising one or more children elements that each describe a different type of extension.

2. The computer-readable storage media of claim 1 wherein: one of the plurality of extensions utilizes one of the plurality of services.

3. The computer-readable storage media of claim 1 wherein: each extension of the plurality of extensions is an interchangeable application building block.

4. The computer-readable storage media of claim 1 wherein:
   a first extension of the plurality of extensions provides functionality to support at least one of: 1) a document type; 2) a user interface action; 3) a file encoding; 4) property settings; and 5) debugging information.

5. A computer-based method for configuring an application in a computer-based extendable application framework, comprising the steps of:
   providing a user interface at a computer to allow user interaction with the application;
   providing a plurality of extensions at the computer to extend the application, wherein each extension of the plurality of extensions include:
   a set of classes defined in an object-oriented programming language,
   an XML (Extensible Markup Language) description, wherein the XML description is scanned for code fragments that are contained within a XML tag and are to be passed to handlers defined for a particular ID attribute at runtime to batch together XML descriptions from other extensions in the plurality of extensions and ensure services requested by the XML description are available,
   an optional set of resources, and
   wherein the extension of the plurality of extensions defines handlers for the XML tag found in the XML description;
   wherein the providing of the plurality of extensions permits one of the plurality of extensions to provide functionality accessible in the user interface; and
   providing a plurality of services wherein the providing the plurality of services permits one of the plurality of services to provide access to functionality in one of the plurality of extensions;
   wherein each service of the plurality of services include a public interface that has an implementation and provides access to functionality in an extension;
   wherein each one of the plurality of services is associated with an extension in the plurality of extensions;
   wherein one of the plurality of extensions exposes and consumes services associated with another extension in the plurality of extensions, wherein the exposed and consumed services are consumed by the set of classes; and
   wherein the XML description comprises a root element comprising one or more children elements that each describe a different type of extension.

6. The method of claim 5 wherein: one of the plurality of extensions utilizes one of the plurality of services.

7. The method of claim 5 wherein: each extension of the plurality of extensions is an interchangeable application building block.

8. The method of claim 5 wherein: an extension of the plurality of extensions provides functionality to support at least one of: 1) a document type; 2) a user interface action; 3) a file encoding; 4) property settings; and 5) debugging information.

9. A computer-readable storage medium having stored thereon computer instructions for a computer-based extendable application framework system that when executed by a processor cause instructions for system to:
   provide a user interface to allow user interaction with an application;

provide a plurality of extensions to extend the application, wherein the plurality of extensions provide functionality accessible in the user interface, wherein each extension of the plurality of extensions includes:
- a set of classes defined in an object-oriented programming language, and
- an XML (Extensible Markup Language) description,
  - wherein the XML description is scanned for code fragments that are contained within an XML tag and are to be passed to handlers defined for a particular ID attribute at runtime to batch together XML descriptions from other extensions in the plurality of extensions and ensure services requested by the XML description are available,
- an optional set of resources, and
- wherein the extension of the plurality of extensions defines handlers for the XML tag found in the XML description;

wherein the providing of the plurality of extensions permits one of the plurality of extensions to provide functionality accessible in the user interface;

provide a plurality of services wherein the providing of the plurality of services permits one of the plurality of services to provide access to functionality in one of the plurality of extensions;

wherein each service of the plurality of services includes a public interface that has an implementation and provides access to functionality in an extension of the plurality of extensions;

wherein each one of the plurality of services is associated with an extension in the plurality of extensions;

wherein one of the plurality of extensions exposes and consumes services associated with another extension in the plurality of extensions, wherein the exposed and consumed services are consumed by the set of classes; and wherein the XML description comprises a root element comprising one or more children elements that each describe a different type of extension.

10. The computer readable storage medium of claim 9 wherein:
one of the plurality of extensions utilizes one of the plurality of services.

11. The computer readable storage medium of claim 9 wherein:
each extension of the plurality of extensions is an interchangeable application building block.

12. The computer readable storage medium of claim 9 wherein:
an extension of the plurality of extensions provides functionality to support at least one of: 1) a document type; 2) a user interface action; 3) a file encoding; 4) property settings; and 5) debugging information.

13. The computer-readable storage media of claim 1, wherein the plurality of services includes at least one of:
- a resource service to provide access to a set of resources;
- a frame service to allow extensions of the plurality of extensions to specify a graphical user interface (GUI) docking layout;
- a file service to provide a set of services for file system access and manipulation;
- a server service to provide a set of services for accessing a server;
- a document service to supply an abstract document interface for files that are part of an application project; and
- an action service to provide methods for adding and manipulating menu and toolbar items.

14. The method of claim 5, wherein the plurality of services includes at least one of:
- a resource service to provide access to a set of resources;
- a frame service to allow extensions of the plurality of extensions to specify a graphical user interface (GUI) docking layout;
- a file service to provide a set of services for file system access and manipulation;
- a server service to provide a set of services for accessing a server;
- a document service to supply an abstract document interface for files that are part of an application project; and
- an action service to provide methods for adding and manipulating menu and toolbar items.

15. The computer readable storage medium of claim 9, wherein the plurality of services includes at least one of:
- a resource service to provide access to a set of resources;
- a frame service to allow extensions of the plurality of extensions to specify a graphical user interface (GUI) docking layout;
- a file service to provide a set of services for file system access and manipulation; a server service to provide a set of services for accessing a server;
- a document service to supply an abstract document interface for files that are part of an application project; and
- an action service to provide methods for adding and manipulating menu and toolbar items.

* * * * *

UNITED STATES PATENT AND TRADEMARK OFFICE
CERTIFICATE OF CORRECTION

PATENT NO. : 7,636,722 B2
APPLICATION NO. : 10/786772
DATED : December 22, 2009
INVENTOR(S) : Bunker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 496 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,636,722 B2 | Page 1 of 1 |
| APPLICATION NO. | : 10/786772 | |
| DATED | : December 22, 2009 | |
| INVENTOR(S) | : Ross Bunker et al. | |

It is certified that error appears in the above-identified patent and that said Letters Patent is hereby corrected as shown below:

On the title page, item (75), in column 1, in "Inventors", line 1, delete "Bunkerr," and insert -- Bunker, --, therefor.

In column 11, line 50, delete "jws" and insert -- .jws --, therefor.

In column 13, line 54, delete "the" and insert -- The --, therefor.

In column 23, line 61, delete "resouces" and insert -- resources --, therefor.

In column 26, line 65, in claim 9, delete "for" and insert -- for the --, therefor.

Signed and Sealed this

Sixteenth Day of November, 2010

David J. Kappos
*Director of the United States Patent and Trademark Office*